June 1, 1948. C. B. HARP 2,442,358
DESILTING BASIN
Filed Nov. 24, 1945 2 Sheets-Sheet 1
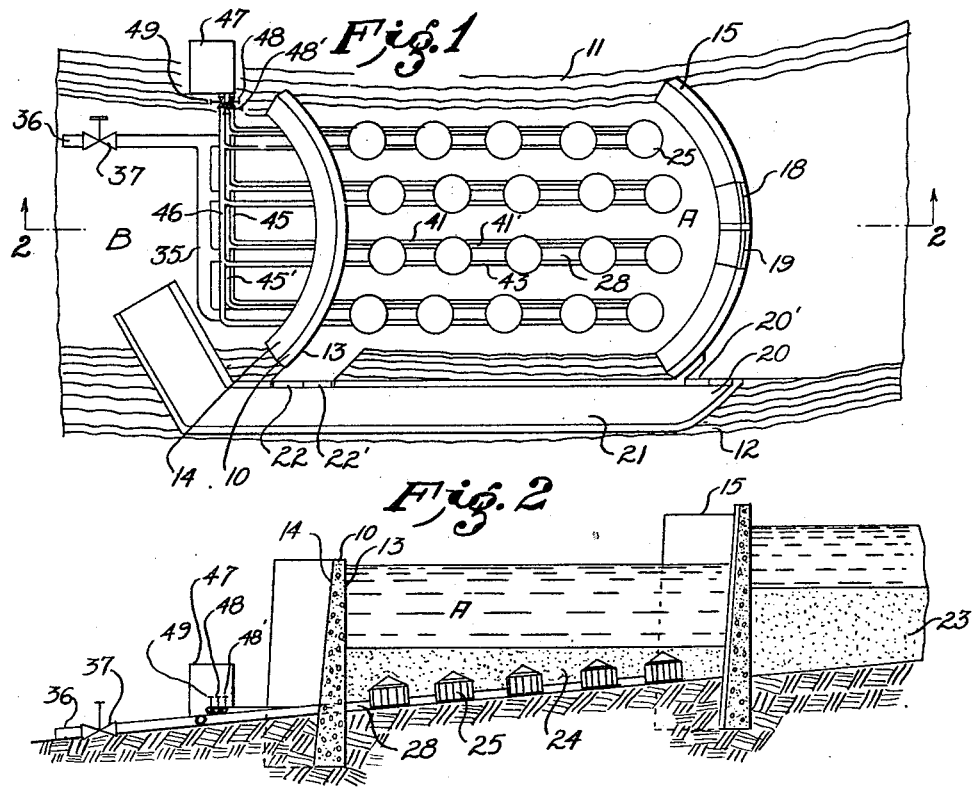
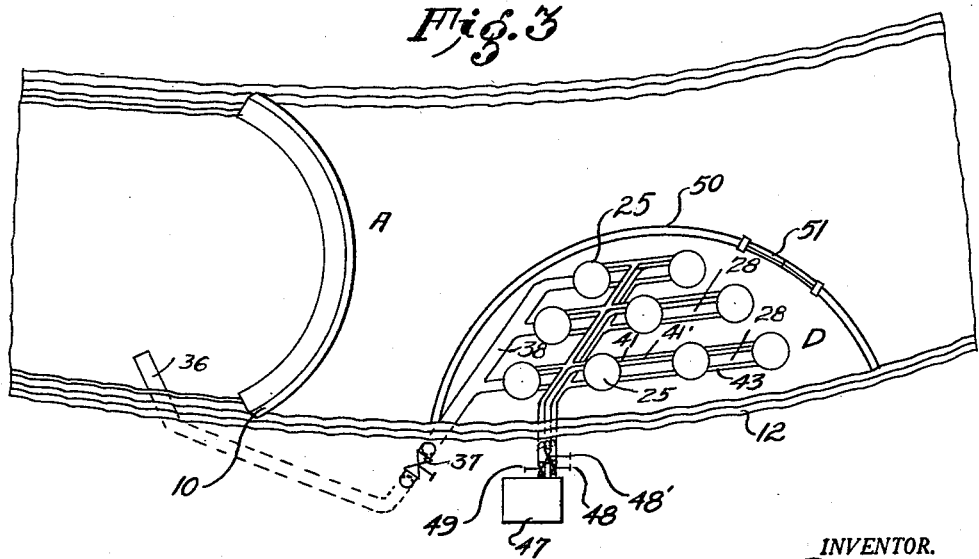
INVENTOR.
CHARLES B. HARP.
BY James M. Abbott
ATTY.

June 1, 1948.  C. B. HARP  2,442,358
DESILTING BASIN
Filed Nov. 24, 1945   2 Sheets-Sheet 2
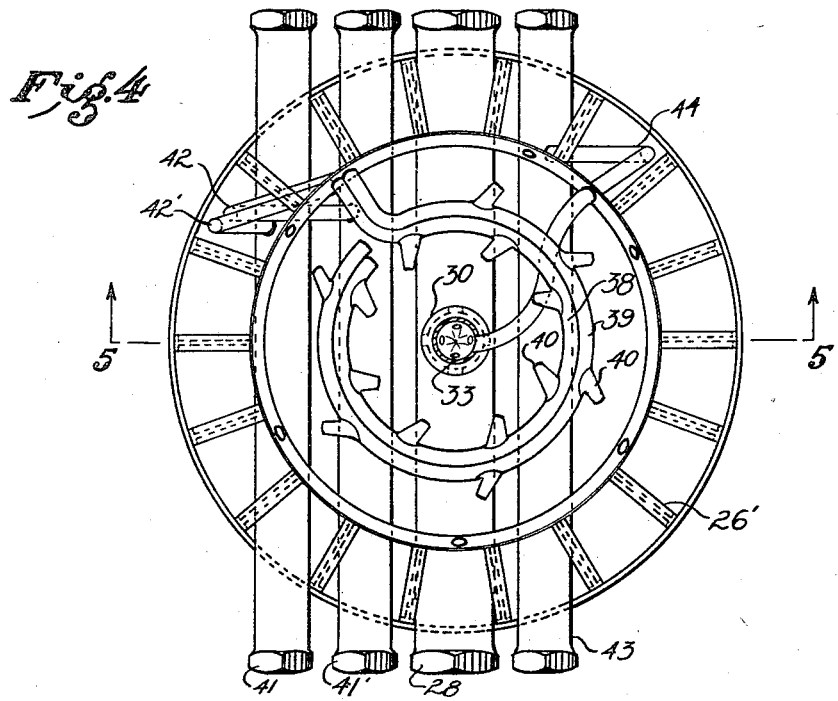
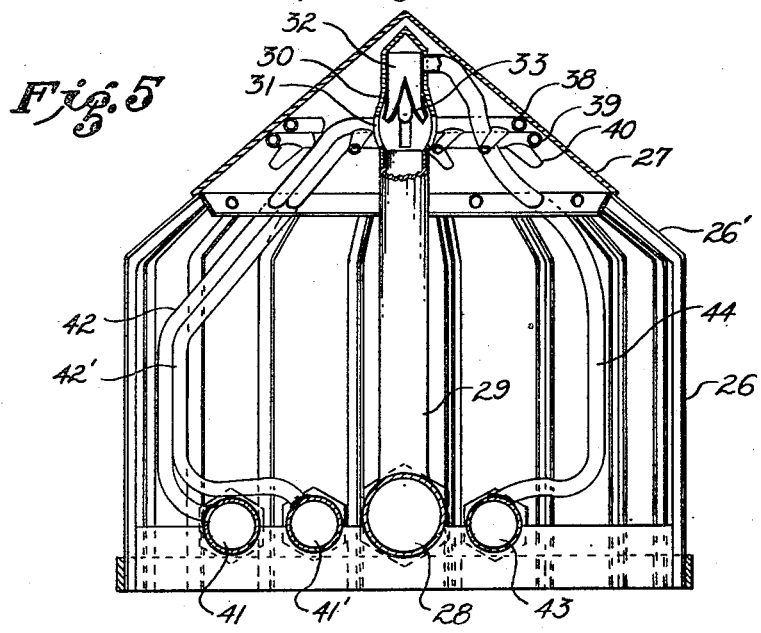
INVENTOR.
CHARLES B. HARP.
BY James M. Abbott
Atty.

Patented June 1, 1948

2,442,358

UNITED STATES PATENT OFFICE 2,442,358

DESILTING BASIN

Charles B. Harp, Los Angeles, Calif.

Application November 24, 1945, Serial No. 630,596

2 Claims. (Cl. 61—2)

This invention relates to a silt removing system and particularly pertains to a desilting basin.

In various systems in which water is impounded either by natural or artificial barriers it is well known that the suspended solids within the impounded water accumulate as silt and eventually render the barrier ineffective, and thus prevent proper control of the water. When such a condition arises it is necessary to remove the accumulated silt which, under some conditions, may require the erection or creation of a water barrier above the zone of accumulated silt. It is desirable, therefore, to provide means whereby the silt which settles out of the impounded water above a barrier may be removed as required with a minimum disturbance of the silt in the impounded water, and whereby the flow of water may be deviated in its course so that access to the silt removing apparatus may be obtained when desired. In my Patent No. 1,777,491, entitled "Method of desilting channels," granted October 7, 1930, and in my Patent No. 1,986,148, granted January 1, 1935, entitled "Silt removing head," I have shown structures which are applicable to the solution of the present problem, while in the present application means are provided to render operation of said structures more efficient and to make it possible to control the stream of water so that it may have uninterrupted flow, even when it is necessary to repair or remove the desilting apparatus. It is the principal object of the present invention, therefore, to provide a desilting basin equipped with desilting apparatus for drawing off the accumulating silt, and which basin is so arranged as to make it possible to divert the course of flow of the stream of water so that desired operations may be performed in connection with the desilting basin without interrupting the normal overflow stream at the barrier.

The present invention contemplates the provision of a barrier formed with a desilting basin thereabove and a diverting basin, whereby normal desilting operations may take place, and the flow of the stream of water may be controlled in the diverting basin to make drainage of the desilting basin possible when desired.

The invention is illustrated by way of example in the accompanying drawings in which:

Figure 1 is a view in plan indicating one form of desilting structure with which the present invention is concerned.

Fig. 2 is a view in central vertical section through the structure as seen on the line 2—2 of Fig. 1.

Fig. 3 is a view in plan showing another form of desilting basin.

Fig. 4 is a fragmentary view in plan showing a portion of a slushing and desilting unit.

Fig. 5 is a view in transverse vertical section through the slushing device, as seen on the line 5—5 of Fig. 4.

Referring more particularly to the drawings, 10 indicates a dam, here shown as erected between opposite banks 11 and 12 of a channel along which a normal flow of water takes place. The dam is here indicated as being of the arch type and presenting a convex face 13 up-stream and a concave face 14 down-stream. In the area adjacent the dam it will thus be seen that an up-stream zone A will be created in which the impounded water is in a state of portial quiescence. On the down-stream side of the dam a zone B occurs. In the present form of the invention a secondary dam 15 is formed across the channel on the up-stream side of the dam 10 and in spaced relation to the dam 10. This dam is provided so that repairs may be made in the desilting apparatus between the dams 10 and 15 without interrupting the supply of water and without causing the supply stream to be filled with suspended solids, such as the agitated silt in the area between the two dams.

The dam 15 has a plurality of control gates 18 and 19 through which water, which has been impounded above this dam may flow into the zone A. The zone A occurs between the dams 10 and 15. A lateral spillway 20 connects the stream above dam 15 with the main spillway 21, which is here shown as extending along the channel bank 12. A lateral spillway 22 connects the zone A with the main spillway 21, after which the spillway 21 discharges into the zone B, which is on the down-stream side of the dam 10. It will be understood that the spillways 20 and 22 are contiguous to the up-stream faces of the dams 15 and 10, respectively, and that the dam 15 is fitted with a suitable gate 20', by which it may be opened and closed when required. The spillway 22 is provided with a gate 22'.

By reference to Fig. 2 of the drawing it will be seen that a silt bed 23 will accumulate above the dam 15, and that a silt bed 24 will accumulate within the zone A. It is desirable to provide means for flushing and desilting the silt bed 24 from beneath the accumulated bed of silt. This insures that the silt will be removed without disturbing the impounded water and while maintaining the water at a maximum clarity. A desilting device suitable for the present purpose is shown in Patent No. 1,986,148, issued to me on January 1, 1935.

In order to practise the present invention desilting units are mounted at intervals at the bottom of desilting beds, indicated at zone A in Fig. 1 and zone D in Fig. 3. The units are generally indicated by the numeral 25 in the drawings. By reference to Figs. 4 and 5 it will be seen that these units include a frame structure comprising a plurality of vertical rods 26 which are arranged in equal spaced circumferential relation to each other and have inturned portions 26' at their upper ends which converge to form a frame suitable for supporting a cone-shaped canopy 27. The canopy is thus spaced a distance above the floor of the zone in which the structure is mounted and forms a cover for a water circulating and desilting system, which will be buried under the bed of silt so that silt may be withdrawn from beneath the canopy of each of the units as the desilting operation takes place. The canopy is presented with its apex extending upwardly and its walls are suitably sloped so that the silt will not accumulate on the walls but will move downwardly therealong. It will be understood that the vertical frame members 26 are spaced a distance from each other sufficient to allow a clear flow of water and silt beneath the canopy and into the conduits by which it will be withdrawn. Extending along the floor of the zone within which the silt bed accumulates a plurality of drain pipes 28 are provided. These pipes are arranged in parallel rows and are disposed in the direction of inclination of the floor of the silt bed. This is to insure that proper drainage will take place when a desilting operation is to be carried out. These pipes are of relatively large diameter and are fitted with tubular vertical columns 29 at intervals throughout their length. These columns are formed at their upper ends with an enlarged intake head 30 having vertical slots 31 through its side walls. The upper end of each of the heads is closed and is fitted with a spray head 32 carrying nozzles 33 which extend downwardly and outwardly and direct jets of water downwardly and outwardly through the slots 31. The nozzles 33 are only supplied with water when it is necessary to clean the slots 31 to permit a free flow of water inwardly to the tubular columns 29. The tubular columns 29 extend vertically and their upper closed ends, within which the nozzles 33 are mounted, occur directly beneath the apex of the canopies 27 and concentrically thereof. It is to be understood that the height of the canopies is such as to insure that the heads 31 will be well above the lower marginal edge thereof so that the silt which may flow beneath the canopies may be agitated by water jets and may flow freely into the heads 31 without violently disturbing the mass of silt surrounding each of the desilting units and beneath which the desilting heads are buried.

The drain pipes 28 are led down-stream. In Fig. 1 of the drawing they are shown as passing beneath the dam 10, where they connect with a lateral pipe 35 leading to a discharge pipe 36. The discharge pipe 36 is fitted with a cut-off valve 37, which when opened will allow the silt and water to drain downwardly to a discharge point within the basin B beyond the dam 10.

In order to agitate the silt which finds its way beneath the canopy 27 of each of the desilting units 25 are nozzle rings 38 and 39 mounted within the canopy at substantially the level of the slots 31 in the desilting heads 30. These nozzle rings carry nozzles 40. The two sets of nozzles are disposed tangentially to the vertical axis of a desilting unit and the nozzles in the two sets are directed oppositely and slightly inclined downwardly. This causes jets of water to be forced downwardly in a gyratory movement acting to agitate the silt which accumulates beneath the canopy and which is to be drained off through the drain conduit 28. The nozzle rings 38 and 39 are connected to distributing pipes 41 and 41' by pipes 42 and 42' respectively. The spray heads 32 are connected to a distributing pipe 43 by pipes 44. The pipes 41, 41' and 44 are laid parallel to the pipes 28 and are here shown as being carried beneath the dam 10 to connect with lateral pipes 45, 45' and 46, respectively, which lead to a suitable pump 47. The lateral pipes 45, 45' and 46 are equipped with valves 48, 48' and 49, respectively. This makes it possible to control the flow of water separately to the nozzle rings 38 and 39 and the spray heads 32. This is desirable, for as previously explained the spray heads are not intended to be supplied with water continuously, but are used only to flush the drain heads 30 at the top of the drain columns 29.

Referring particularly to the form of device shown in Fig. 3 of the drawing, it will be seen that instead of providing a dam 15 which extends entirely across the stream a cofferdam is provided, as indicated at 50. This dam is disposed at one side of the stream, such for example as along bank 12. The purpose of this structure is to provide means for drawing off a supply of clear water from the stream for domestic or irrigation purposes and does not contemplate obstructing the flow of the main stream of water. Mounted within the cofferdam are a plurality of desilting units 25, as previously described, which are fitted with the piping system as shown in Figs. 1 and 5 of the drawing. Gates 51 are formed in the upstream face of the dam 50 and make it possible for water to flow normally into the zone D. A pit is provided within which control valves 48, 48' and 49 are connected with the piping system and supply water under pressure to the desilting heads. By the arrangement here shown it is possible to provide a normal flow stream from the main stream into the zone D and from thence to the channel below the dam 10. At the same time the dam 10 impounds water above it but it is not necessary to remove silt from this quiescent zone. The silt which settles within the zone D may be removed by the desilting heads when the gates 51 are closed and a desilting operation is established within the zone D until the water is all drained out of the zone D through pipes 28.

In practising the present invention with the apparatus here shown reference will first be made to the form of the invention shown in Figs. 1 and 2 of the drawing. Under normal operation the gates 18 and 19 on the auxiliary dam 15 are open, and the gates 20' at the head of the spillway 21 are closed. When a sufficient amount of water is impounded in the zone A the gates 20' may be adjusted to allow a desired amount of overflow, or water may follow its normal course over the dam. During this time the stream of water will carry silt down to the dam 10 and will cause it to accumulate on the bed of the zone indicated at A. In this bed the previously described desilting units 25 have been assembled and connected to suitable pipes for supplying water to the desilting units as well as for drawing off liquid and silt. It is desirable to control the flow of the stream of water in the channel so that silt will accumulate to a level considerably above the tops of the desilting units 25, as indicated in Fig. 2 of the drawing. When it is determined to clean silt from the zone A the gates 18 and 19 in the auxiliary dam 15 and gate 22' to the spillway 21 are closed, and the gate 20' to the spillway is opened. Water is then delivered from the pump 42 through the pipes 41 and 41' and 43 to the individual desilting units. It is to be understood that any desired number of water distributing pipes may be used. However, it is necessary to provide the nozzle heads 32 with a separate supply of water so that this supply may be established and interrupted by the control valve 49. This valve is opened only when the slots 31 in the head 30 are clogged. After the slots 31 are opened it is evident that silt and water will flow into the head and then down through the column 29 leading to the drain pipe 28. When the valve 37 is open this material will drain to a point of discharge below the dam 10. In order to dislodge the silt which has deposited within the zone A the valves 48 and 48' are opened so that the pump may force water into the pipes 41 and 41' and up to the nozzle rings 38 and 39. It is to be understood that there may be any number of such rings as are required, and that they may be fitted with nozzles directed at different angles, such as the nozzles 39 and 40. When water under pressure is ejected from the nozzles 39 and 40 the mass of silt will be agitated beneath the canopy 27 and will flow freely through the slots 31 in the nozzle heads 30. As the space directly beneath the canopy 27 is evacuated silt and water will draw in from around the lower edges of the canopy and may be drained continuously into the columns 29 and the drain pipes 28. It is to be pointed out that the vertical frame elements 26 which support the canopy are spaced a sufficient distance apart to allow silt and water to flow but will act as barriers to prevent trash, rocks and other large pieces of debris from accumulating beneath the canopy 27 and around the head 30. It is also to be pointed out that the pressure created by the weight of the mass of silt above the desilting units 25 and the hydrostatic head of water, as represented by the water level in the zone A, will tend to gradually move the silt downwardly and to force it into the drain heads 30. This will be done without disturbing the silt in a manner to mix it with the water resting upon the silt bed. Thus, the water will remain clear even though a desilting operation is taking place within the zone A.

After the desilting operation has been completed the gates 20' may be closed to prevent water from flowing into the spillway 21. The gates 18 and 19 in the dam 15 and gate 22' to the spillway 21 are then opened to allow zone A to re-fill and to start a new cycle of silt accumulation.

In the form of the invention shown in Fig. 3 of the drawings, it will be seen that the operation will be substantially the same as previously described save for the fact that the desilting zone, as indicated at D, occupies only a small area of the stream channel above the dam 10.

It will thus be seen that by the method and means here shown an accumulation of silt in an impounded stream of water may be easily withdrawn with a minimum amount of disturbance of the water stream and a minimum change in its clarity, and that the structure may be easily manipulated to insure that a desilting apparatus may be repaired conveniently when required.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. A method of removing a bed of silt from an impounded zone of water between a primary dam and a secondary dam by which the zone is defined, and on the floor of which zone desilting units are placed, each comprising a canopy spaced from the floor of said zone and beneath which water induction nozzles and water and silt eduction members occur, which method consists in permitting an accumulation of silt to occur within said zone to a desired level above the desilting units, then interrupting the flow of water over the secondary dam and into said zone, thereafter establishing communication between the eduction means of the desilting units to a point below the primary dam, and simultaneously delivering water under pressure through the induction nozzles, whereby the silt within the area sheltered by the canopies will be agitated and will flow freely with the water into the eduction means, thus removing silt from the accumulated silt bed below the level of the top thereof.

2. A desilting besin to be disposed in a water channel and compising a primary dam extending across said channel, a secondary dam extending across the channel on the up-stream side of the primary dam and spaced therefrom to form an intermediate desilting zone, gates in the secondary dam, a spillway leading from a point in the channel above the secondary dam to a point in the channel below the primary dam, a plurality of desilting units distributed over the floor of the channel in the desilting zone, said units each comprising a canopy having downwardly extending side walls, the marginal edges of which are spaced a desired distance above the floor of the channel, drain conduits leading from said desilting units and carrying drain heads which are disposed beneath the canopy and above the level of the marginal edges thereof, silt agitating nozzles mounted within the canopies and arranged substantially around the drain heads, and conduits through which water is delivered under pressure to said nozzles to agitate the silt beneath the canopies and to place it in suspension so that it may flow outwardly through the drain heads.

CHARLES B. HARP.

REFERENCES CITED

The following references are of record in the file of this patent:

UNITED STATES PATENTS

| Number | Name | Date |
|---|---|---|
| 1,777,491 | Harp | Oct. 7, 1930 |
| 1,988,148 | Harp | Jan. 1, 1935 |

FOREIGN PATENTS

| Number | Country | Date |
|---|---|---|
| 44,689 | Austria | 1910 |
| 239,516 | Germany | 1911 |